(12) United States Patent
Li et al.

(10) Patent No.: US 7,616,190 B2
(45) Date of Patent: Nov. 10, 2009

(54) ASIAN LANGUAGE INPUT USING KEYBOARD

(75) Inventors: Dong Li, Beijing (CN); Yuan Kong, Kirkland, WA (US); Wen-Hui Hao, Beijing (CN); Qian Xun Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 10/860,278

(22) Filed: Jun. 4, 2004

(65) Prior Publication Data

US 2006/0007157 A1  Jan. 12, 2006

(30) Foreign Application Priority Data

May 26, 2004  (CN)  .................. 2004 1 0047447

(51) Int. Cl.
    *G06F 3/02* (2006.01)
(52) U.S. Cl. .................... 345/168; 345/171; 341/20
(58) Field of Classification Search ......... 345/168–172; 341/20–23
    See application file for complete search history.

(56) References Cited

U.S. PATENT DOCUMENTS

| 5,410,306 | A  | * | 4/1995  | Ye ................. 341/28 |
| 5,952,942 | A  | * | 9/1999  | Balakrishnan et al. ........ 341/20 |
| 6,573,844 | B1 |   | 6/2003  | Venolia et al. |
| 6,822,585 | B1 | * | 11/2004 | Ni et al. .................. 341/28 |
| 6,847,311 | B2 | * | 1/2005  | Li ................. 341/28 |
| 6,993,474 | B2 | * | 1/2006  | Curry et al. .............. 704/3 |
| 7,013,258 | B1 | * | 3/2006  | Su et al. .............. 704/1 |
| 2005/0027534 | A1 |   | 2/2005 | Meurs et al. |
| 2005/0114138 | A1 |   | 5/2005 | Tomishige et al. |
| 2005/0140653 | A1 | * | 6/2005 | Pletikosa et al. ............ 345/168 |
| 2005/0182616 | A1 |   | 8/2005 | Kotipalli |

FOREIGN PATENT DOCUMENTS

CN   1164063 A   11/1997

OTHER PUBLICATIONS

Internet Printout: http://www.loc.gov/catdir/pinyin/romcover.html, Library of Congress Pinyin Conversion Project, New Chinese Romanization Guidelines, dated May 4, 2004.
Toshiyuki Masui, "An Efficient Text Input Method for Pen-based Computers", CHI 98, pp. 328-335, Apr. 1998.
Heiko Sacher, Interactions In Chinese: *Designing Interfaces for Asian Languages*, pp. 28-38, 1998.
Sally Grisedale et al., "Designing A Graphical User Interface For Healthcare Workers In Rural India", CHI 97, pp. 471-478, 1997.
Written Opinion from Australian Patent Office dated Sep. 26, 2006 in Case No. SG 200503359-2.

(Continued)

*Primary Examiner*—Richard Hjerpe
*Assistant Examiner*—Kimnhung Nguyen
(74) *Attorney, Agent, or Firm*—Merchant & Gould (57) ABSTRACT

A system and process for helping users enter information in an Asian language is described. In some aspects, pinyin input for Chinese is described with respect to dedicated keys of a keyboard.

14 Claims, 9 Drawing Sheets

OTHER PUBLICATIONS

Search Report from Australian Patent Office dated Sep. 26, 2006 in Case No. SG 200503359-2.
Derwent Abstract Accession No. 01-103696 (CN 1146573, Nov. 9, 1995, Chen).
Derwent Abstract Accession No. 04-391858 (CN 1482530, Jul. 4, 2003, Zeng).
Derwent Abstract Accession No. 05-243020 (CN 1556452, Dec. 31, 2003, University of Harbin Polytecnic).
Li Zhiping, Zu Lihua, "Twelve QA about Microsoft Pinyin Input—A Chinese Input that does not need much memories", pp. 111-117, vol. 11 of 2002, Dec. 31, 2002.
People's Republic of China Office Action, dated Jan. 23, 2009 cited in Chinese Application No. 200410047447.0.
People's Republic of China Office Action, dated Nov. 23, 2007 cited in Chinese Application No. 200410047447.0.
People's Republic of China Office Action, dated Jul. 18, 2008 cited in Chinese Application No. 200410047447.0.

* cited by examiner

ASIAN LANGUAGE INPUT USING KEYBOARD

RELATED APPLICATION INFORMATION

This application claims priority to Chinese Application No. (003797.01014), entitled "Asian Language Input Using Keyboard", to Dong Li, Yuan Kong, Wen-Hui Hao, and Qian Xun Li, filed May 26, 2004, whose contents are expressly incorporated herein by reference.

BACKGROUND OF THE INVENTION

1. Technical Field

Aspects of the present invention relate to hardware and software products. More particularly, aspects of the present invention relate to providing users with an improved process for entering information in Asian languages.

2. Description of Related Art

Computing systems exist in a number of languages. These languages include character-based representations and symbol-based representations of words. While the Western 104 key keyboard is widely used around the world, users of symbol-based languages have needed a way to input symbolic while using the limited input that keyboards offer. One way to input symbolic languages is to use an input method editor (IME by the Microsoft Corporation) specific for a language.

Asian textual input is one of the most challenging computing problems existing today. It has been a bottle-neck of Asian language computing. The Asian language character set is continuously growing with every revision to the Unicode standard. For instance, the CJK (Chinese, Japanese, Korean) characters defined in Unicode 2.0 is 20,902 characters. Unicode 3.0 includes 27,484 characters. Extension B further adds 40,771 more characters.

IMEs provide a conversion engine to convert English letters into Asian characters. Generally, the encoding of Asian characters is based on the phonetics of the Asian character. This may include a combination of letters or letters and numbers. At times, one may need to convert English punctuation into the Asian language's punctuation. Further, English text may be combined with Asian text (and/or mixed with symbols, phonetic letters/characters and Asian ideograph (Chinese characters)), thereby requiring the ability to switch between encoding methods quickly and easily.

There are a number of issues associated with previous approaches:

a. It may be difficult to discover and access necessary functions in IME including basic functions;
b. It may be difficult to remember necessary IME functions on a consistent use basis;
c. The input process is error-prone due to the above issues as well as conflicts between keys that have different purposes (for instance, SHIFT keys that have different functions based on a state of an application);
d. The input process suffers from reduced productivity due to one or more of the following:
  i. Less efficient use or no use of key IME functions;
  ii. Consequential error rate described in c) above;
  iii. Touch-typing is virtually eliminated as users are forced to searching a keyboard and picking or pressing the key.

An improved system is needed that allows users to quickly and easily enter text in Asian languages.

BRIEF SUMMARY

Aspects of the present invention address one or more of the issues mentioned above, thereby providing a solution to text entry in Asian languages. Aspects of the invention include a keyboard with dedicated keys for functions. Functions include mode switching, among others.

These and other aspects are addressed in relation to the Figures and related description.

BRIEF DESCRIPTION OF THE DRAWINGS

Various aspects of the present invention are illustrated in the attached figures.

DETAILED DESCRIPTION OF THE DRAWINGS

Aspects of the present invention relate to providing an ability to enter text in Asian languages.

The following is separated into various sections to assist the reader. These headings include: general-purpose computing environment; the 104 keyboard and the 109 keyboard; functions and easily accessed keys; and user interfaces.

General-Purpose Computing Environment

Figure 1:
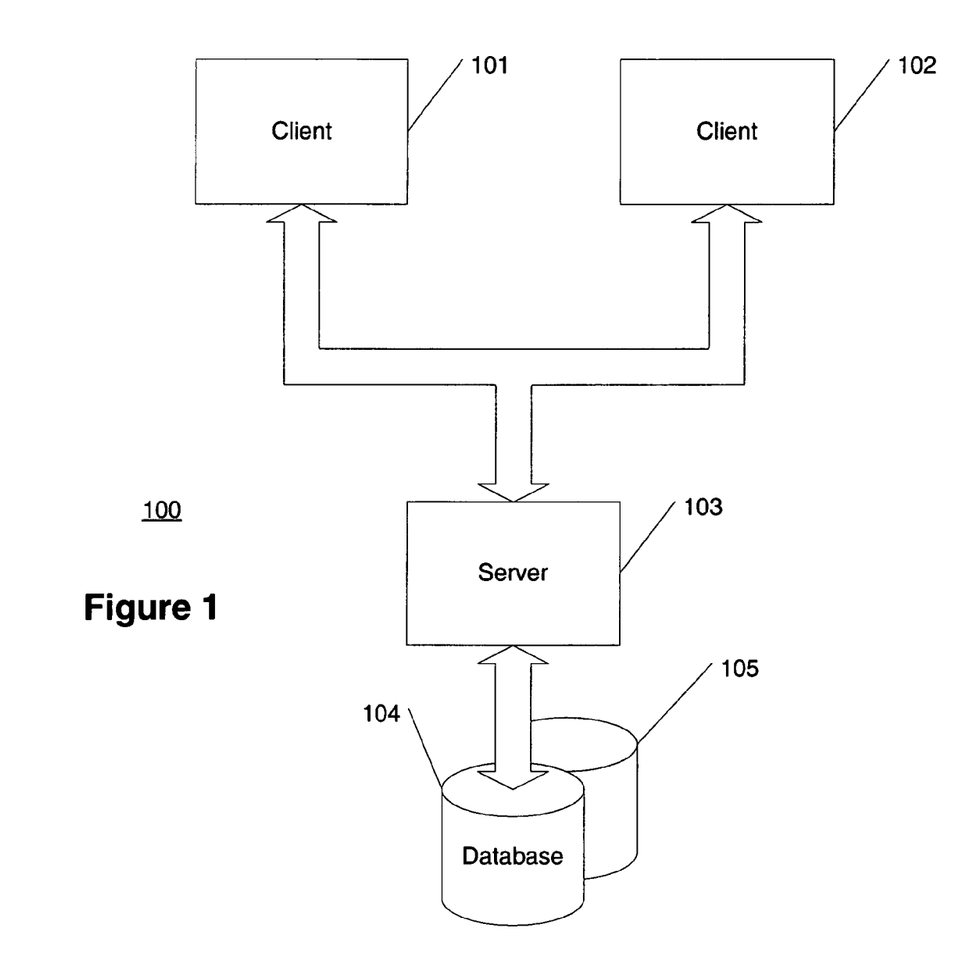
FIGS. 1 and 2 show general-purpose computing environments supporting one or more aspects of the present invention.
Figure 2:
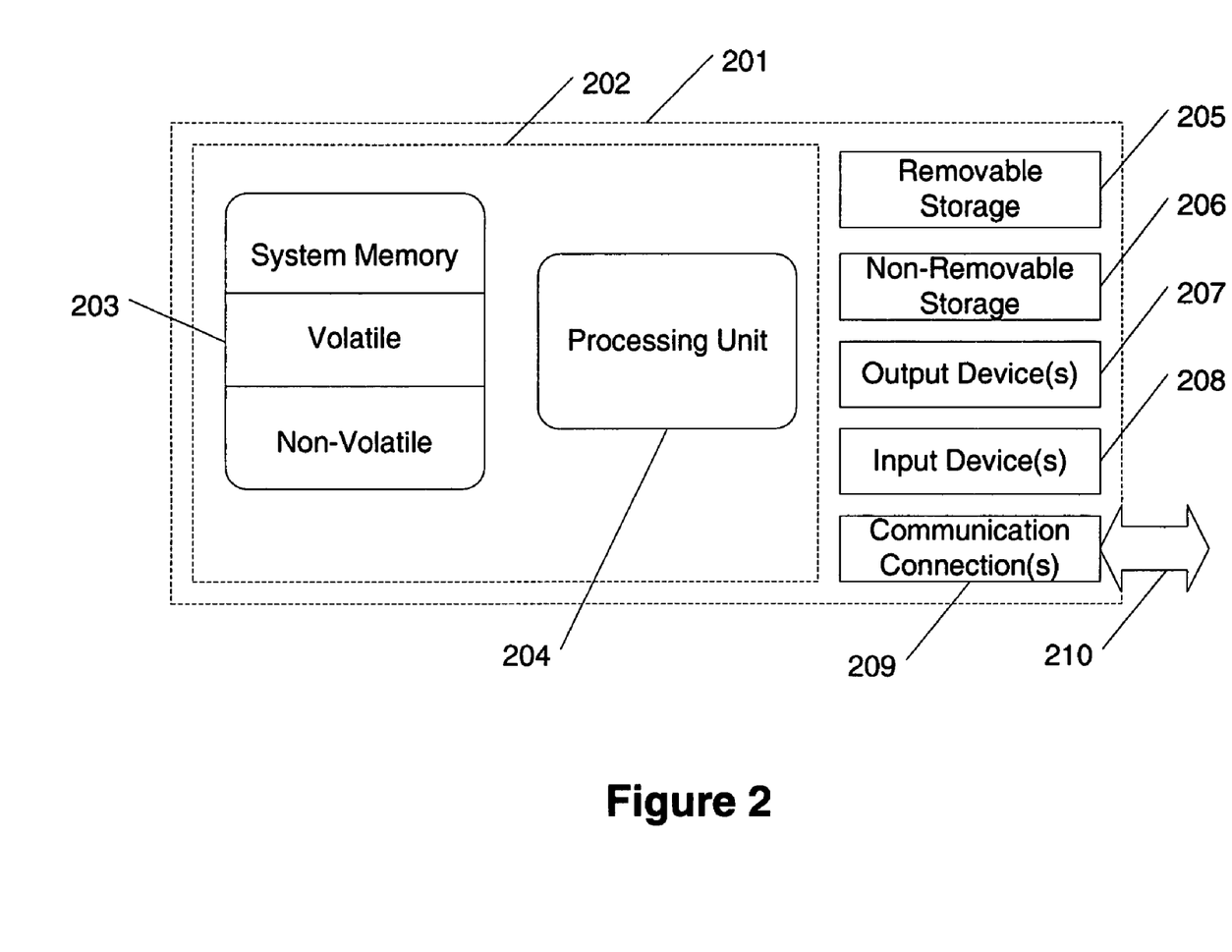

FIGS. 1 and 2 illustrate examples of suitable operating environments 100 and 201 in which the invention may be implemented. The operating environments 100 and 201 are only a few examples of suitable operating environments and are not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Aspects of the invention may be described in the general context of computer-executable instructions, such as program modules, executed by one or more computers or other devices. Generally, program modules include routines, algorithms, programs, objects, components, data structures, etc. that perform particular tasks or implement particular abstract data types. Typically, the functionality of the program modules may be combined or distributed as desired in various embodiments.

Computing device systems 100 and 201 typically include at least some form of computer readable media. Computer readable media can be any available media that can be accessed by server 103 or system 201. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server 103 or system 201.

With reference to FIG. 2, an illustrative system for implementing aspects of the invention includes a computing device, such as device 201. In its most basic configuration, device 201 typically includes a processing unit 204 and memory 203. Depending on the exact configuration and type of computing device, memory 203 may be volatile (such as RAM), non-volatile (such as ROM, flash memory, etc.) or some combination of the two. Additionally, device 201 may also have mass storage (removable and/or non-removable) such as magnetic or optical disks or tape 205-206. Similarly, device 201 may also have input devices such 208 (including a mouse, stylus, keyboard, trackball, and the like) and/or output devices 207 such as a display and the like. Other aspects of device 201 may include network connections 209 to other devices, computers, networks, servers, etc. using either wired or wireless media 210. All these devices are well know in the art and need not be discussed at length here.

The 104 Keyboard and the 109 Keyboard

The current 104 keyboard has some limitations that make the input of Asian language text difficult. These limitations include: mode switching, error correction, common function enablement.

As to mode switching, there are multiple modes in the Asian input method including: English, Phonetic letters, Chinese Characters, English/Chinese punctuation, Full/Half width, etc. Users have difficulty using the conventional 104 keyboard toggle between modes. Often, it is difficult to find keyboard shortcuts (comprising a control, shift, alt, or window's key combined with another character or key) for use with an Asian input mode. This difficulty commonly forces users to use a drop down menu or toolbar to enable these functions. Using these alternative input processes on a regular basis slows text input.

As to error correction, the 104 keyboard is not particularly useful for helping designate candidates. In the Chinese language, there are approximately 400 phonetic syllables. However, Chinese has more than 20,000 characters that correspond to those 400 syllables. Finding the right character to match any one phonetic syllable or combination of syllables can be difficult for users without a robust interface. Further, this interface may be used many times per sentence. Having a multi-key combination as the process to open the interface is laborious if not tedious.

As to common functions, the 104 keyboard does not provide easy access to other common functions. There are some frequently-used functions in Asian input methods, but to enable these functions require several steps of mouse and keyboard operations. Sometimes, users even are not aware of the existence of the functions. Some of the functions may include: launching an input mode and adjusting personal settings.

First, there may be multiple IMEs installed on a user's computer system. A user needs to choose and launch the IME that the user desires. If the user works primarily in a single language, the launching of that IME should be easy to remember.

Second, users often customize the IME to their personal preference. They may need to adjust the settings or property in a property setting sheet or define some professional words/phrases they frequently use. It may be difficult for users to discover the property setting sheet and end-user-define functionality in current designs.

The various IMEs have differing functions. The Japanese IME may be used with a variety of keyboard types including 101, 104, and 109 key keyboards. Using an IME with a 101 or 104 key keyboard has proven difficult. The simplified Chinese IME is referred to as Pinyin. It currently has a number of functions that are accessed by the following set of keystrokes.

| Pinyin Key | Function |
|---|---|
| [Ctrl + Space]: | Activate IME or inactivate IME |
| [Shift]: | Switch Chinese/English input mode of pinyin |
| [ ] | Convert the Chinese char (following the cursor) back to its pinyin string in pinyin composition window |
| | Or, used as the leading key to input user defined phrase by shortcut reading |
| ['] | Add a pinyin segmentor manually, for instance, add a ['] between "xi" and "an" to get "西安" other than "现" |
| [SPACE]: | Select the 1st candidate under pinyin input mode |
| | Or, select the highlighted candidate under error correction mode |
| [ENTER]: | Finalize the ongoing composition string and also reading string (if some) as it is. |
| [Shift + BackSpace]: | Convert the Chinese char (before the cursor) back to its pinyin string in pinyin composition window. |
| [PgDn/PgUp]: | PgDn/PgUp in candidate window |
| [−/=] and [ ] itself: | Same as PgDn/PgUp in candidate window |
| [Left/Right arrow]: | Move cursor left/right in composition or reading string |
| [Up/Down arrow]: | Move candidate highlight in candidate window |
| [Home/End]: | Move cursor to the beginning/End of the composition or reading window |
| [WindowsKey + C] | Re-conversion, used to load determined Chinese string into pinyin composition window for further editing |

One area of concern is the need for users of present day keyboards (including 101, 104, and others) to remember all of these keystrokes. Aspects of the present invention take some of the functions represented for pinyin and assign them to dedicated keys to make input easier for the user of an Asian language IME.

Functions and Easily Accessed Keys

Figure 3:
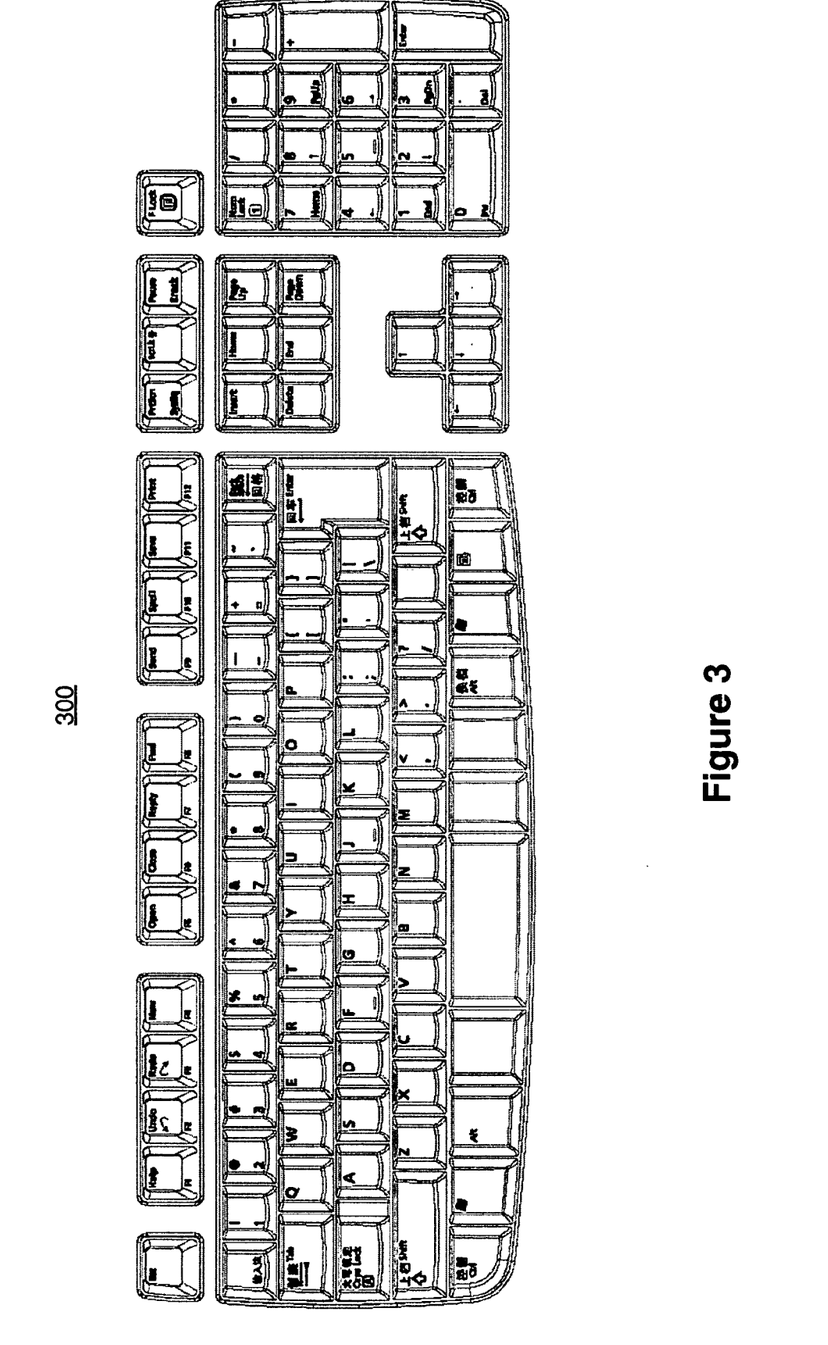
FIG. 3 shows a 109 key keyboard.
Figure 4:
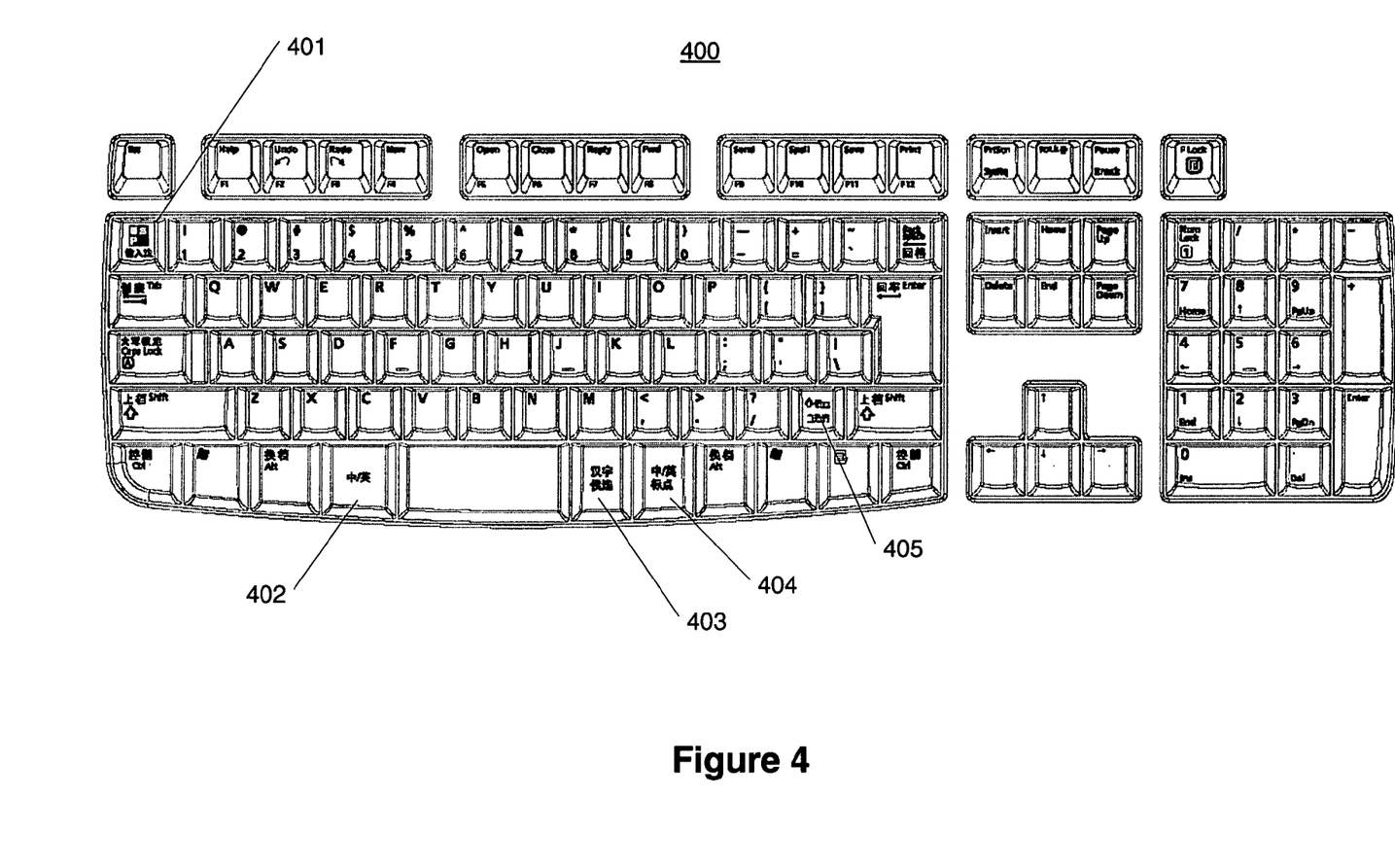
FIG. 4 shows a 109 key keyboard according to aspects of the present invention.

FIG. 3 shows a 109 key layout for a 109 keyboard 300. FIG. 4 shows a 109 key keyboard 400 in accordance with aspects of the present invention. In one aspect of the invention, a 109 key keyboard may assist users in more readily adopting an IME as an input method for languages. Commonly used functions are either duplicated on selected ones of the keys, new functions added to the IME and located on the keyboard, or functions previously assigned to keys are replaced with a new key. A number of the keys are located at the bottom of the keyboard. One benefit of locating a number of the following keys at the bottom of the keyboard is that their location promotes touch typing instead of the traditional "hunt and peck" typing (where one needs to direct attention from the source material or screen and concentrate on a keyboard to find specific keys).

The following key designations are illustrative for a keyboard layout. Various key positions may be mapped differently without departing from the scope of the invention. The keys highlighted herein are keys 401-405.

Key 401 may be a mode switch to turn on and off the pinyin IME (or may be mode switch to turn on the IME only).

Key 402 may be a Chinese/English mode switch.

Key 403 may display a pop-up window for candidate selection. Key 403 may be combined with a reconversion function if the composition window is not active.

Key 404 may toggle between Chinese punctuation and English punctuation.

Key 405 may pop up an end user-defined phrase (EUDP) editor or pull up an IME property setting sheet.

The following lists a number of behaviors for the various keys mentioned above.

Figure 5:
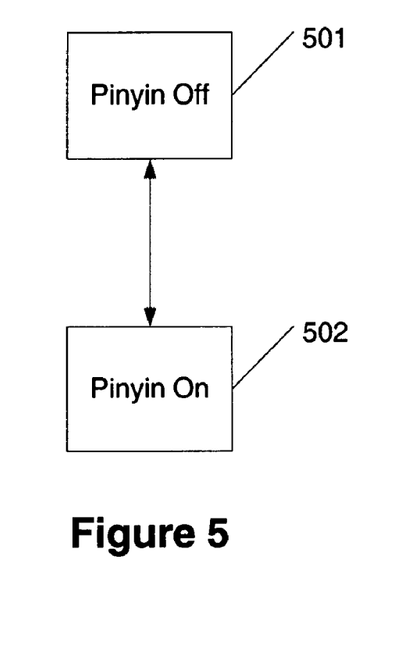
FIGS. 5-10 show various functions according to aspects of the present invention.

Referring to FIG. 5, key 401 may be dedicated to turning an IME on and off. Here, pinyin is turned off in step 501 then on in step 502. Alternatively, key 401 may be a one way switch; it may turn on the IME but not turn it off.

Figure 6:
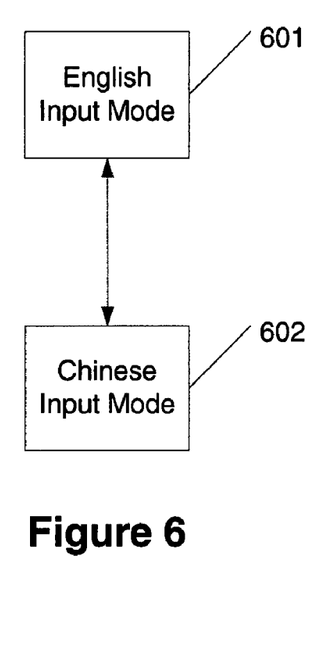

Referring to FIG. 6, when the IME is active, pressing key 402 switches between input modes. For pinyin IME, this is between the Chinese input mode 602 and the English input mode 601. Here, this key duplicates the behavior of the shift key in the pinyin IME. In contrast, however, to the use of the shift key, which may change unexpectedly back to a Chinese input mode while a user is composing a capital letter in the English input mode, it provides a source to switch between the input modes without interfering with user input of text.

Figure 7:
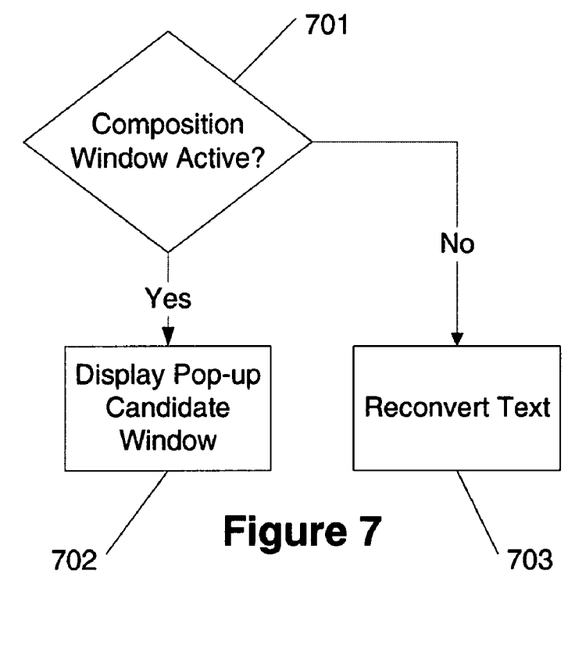

Referring to FIG. 7, key 403 has two functions. If the composition window is active (701) and key 403 is pressed, then the candidate window is displayed (702). If the composition window is not active, then the composition window may be displayed when key 403 is pressed and the candidate window be displayed as well, thereby permitting the text to be reconverted (703). This latter step 703 may duplicate the pinyin IME's function of the windows key+C.

Figure 8:
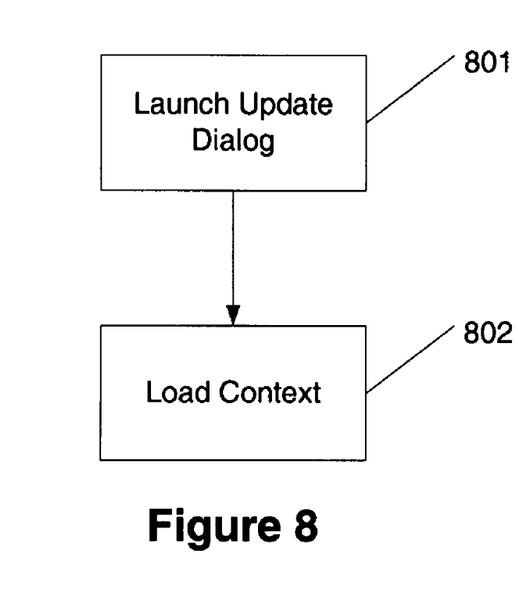

Referring to FIG. 8, pressing key 405 may launch an end user defined phrase tool for defining a phrase commonly used by the end user (for instance, the pinyin IME EUDP tool 801). This may or may not and load the context automatically 802. The context length follows the specification of feeding-context.

Figure 9:
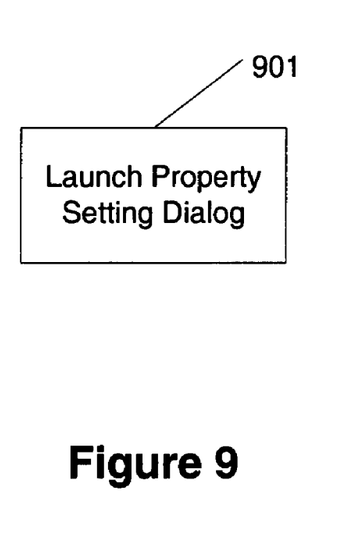

Referring to FIG. 9, the combination of the Shift+key 405 may be used to launch the property setting dialog 901. This allows users to access the property setting dialog easily and directly.

Figure 10:
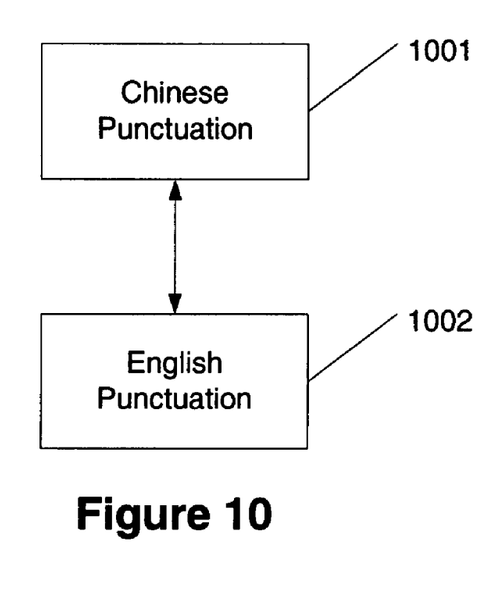

Referring to FIG. 10, if the IME is active, then key 405 switches between the punctuation modes of the system. Here, for the pinyin IME, the system may switch between Chinese punctuation 1001 and English punctuation 1002.

User Interfaces

Various user interfaces may be used with the combination of special keys and the IME. FIGS. 11-14 show various user interfaces for use with the pinyin IME.

Figure 11:
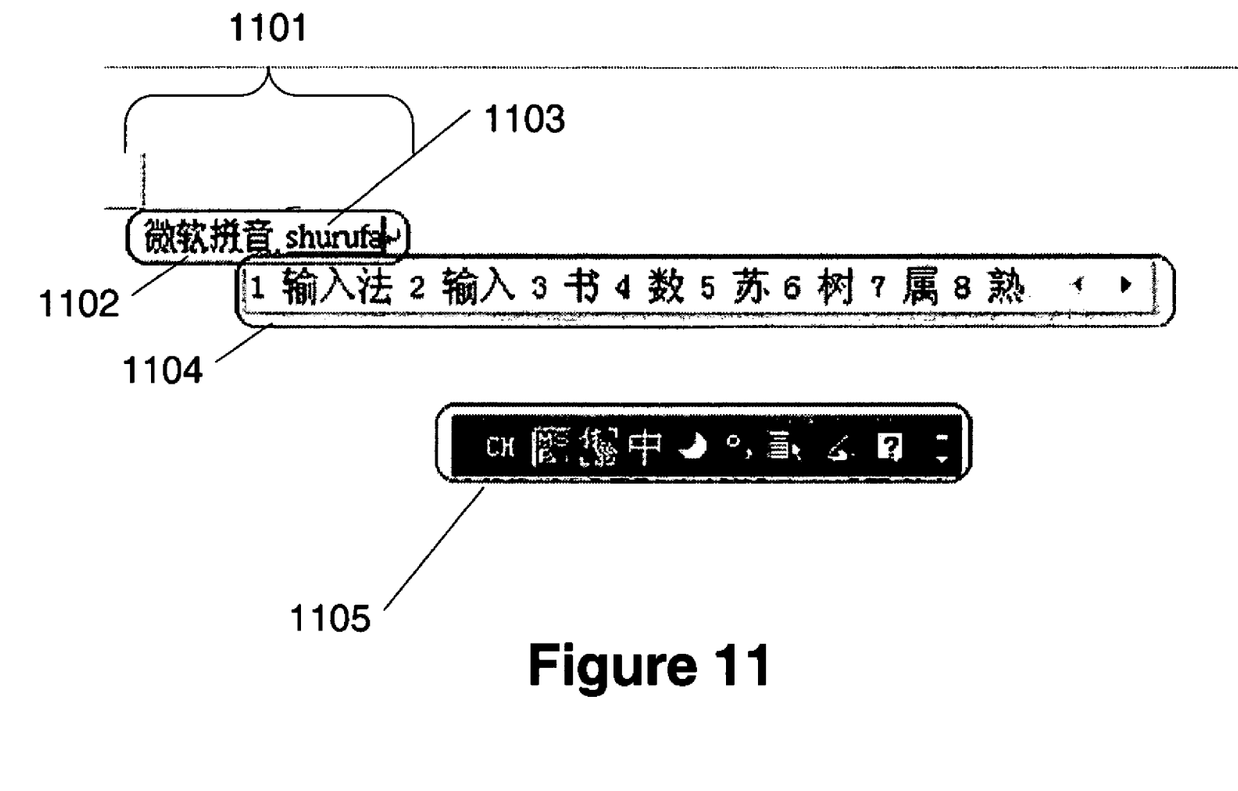
FIGS. 11-14 show various user interfaces according to aspects of the present invention.

FIG. 11 shows various regions that display information to assist the user compose characters. A composition window is shown as region 1101. Composition window 1101 includes characters that have already been composed 1102 and characters that are being composed 1103. FIG. 11 also includes a candidate window 1104 that shows candidates that match the phonetic sounds of the character in 1103. A user then selects the appropriate candidate and it replaces 1103 and is added to composed characters 1102. Finally, FIG. 11 shows a status bar 1105.

Figure 12:
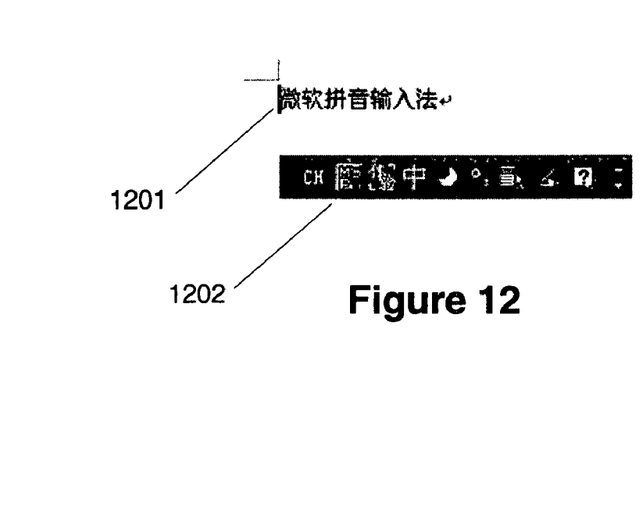

FIG. 12 shows a determined string 1201 and status bar 1202. FIG. 12 shows the user interface before re-conversion. Here, the characters in 1201 have been determined.

Figure 13:
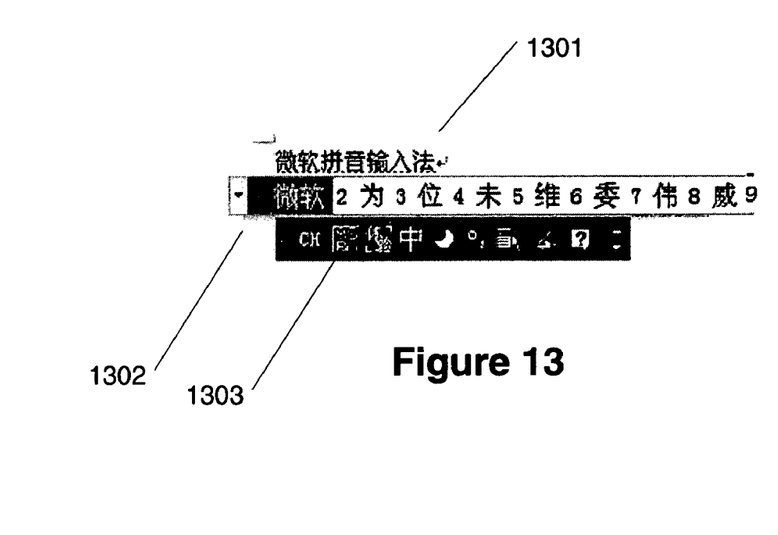

FIG. 13 shows a composition window 1301, candidate list 1302, and status bar 1303. After reconversion, the text string from a page is loaded back into a composition window 1301 and the candidate list 1302 displayed. In FIG. 12, the user may be entering text and having the system pick the appropriate character. In FIG. 13, the user is asking the system for an additional opportunity to modify the text to be what the user intends.

Figure 14:
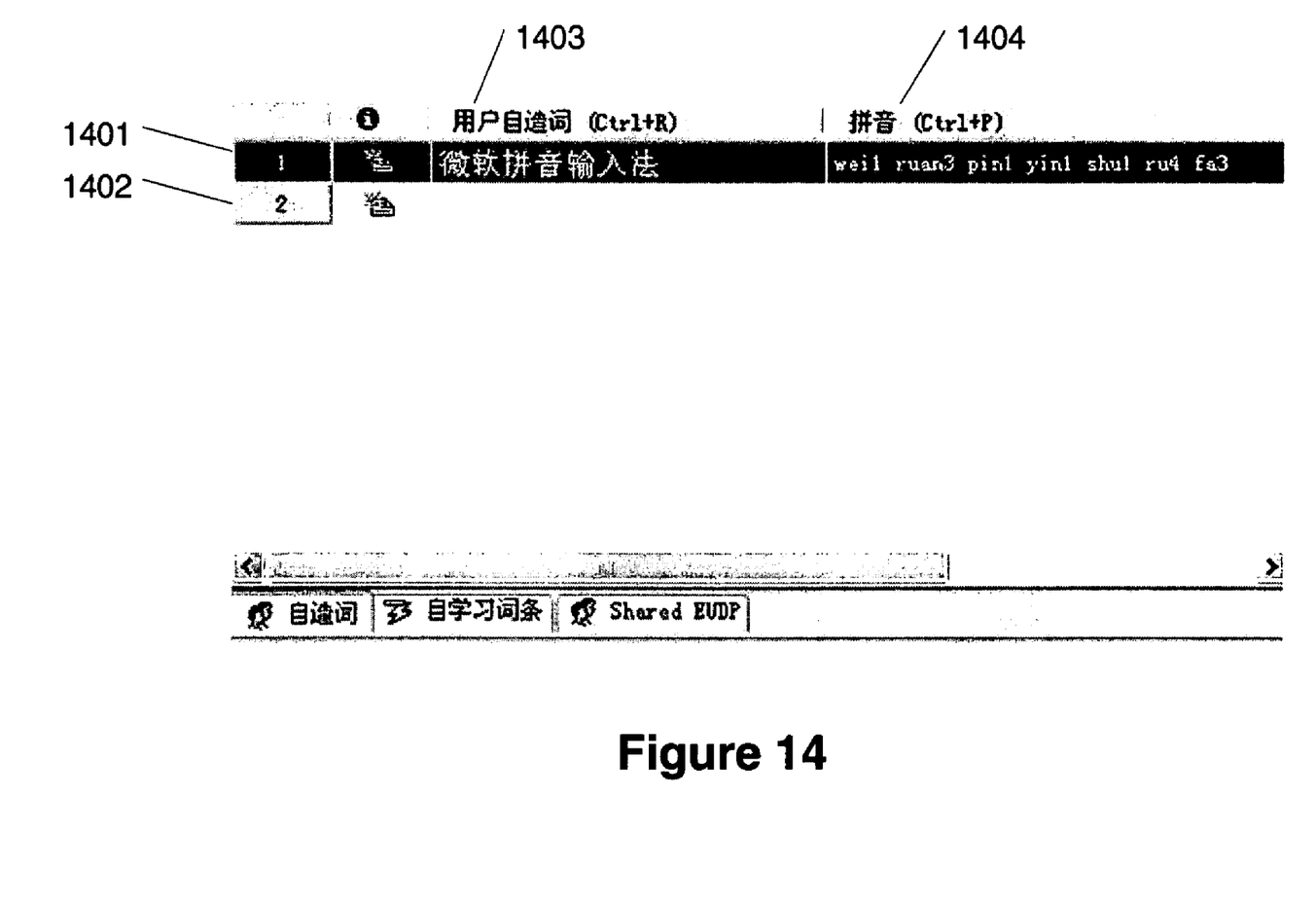

FIG. 14 shows an end user defined phrase tool. Here, a user may enter preferred characters for phonetic inputs. Here, these may be referred to as end user defined phrases. For instance, if one was typing a technical document and one phrase was used more often than others, the user may be provided the ability to specify the character to which the phonetic text should correspond. This allows faster input for the characters.

Various aspects of the invention have been described in relation to a 109 key keyboard. These aspects may be applied to keyboards having more or less than 109 keys, depending on the IME functions and user needs. Also, aspects of the present invention may also be applied to Japanese, Korean, and traditional Chinese as well. For instance, instead of using a pinyin IME, a developer may include a Japanese, Korean, or traditional Chinese IME as well and add functions to keys as described above.

While IMEs from the Microsoft Corporation may be used with aspects of the present invention, other IMEs may be used as well. For instance, the Unicode IME from International Business Machines and VietIME (Cross-platform Vietnamese Input Method Editor) from Sourceforge.net, to name a few.

Aspects of the present invention have been described in terms of illustrative embodiments thereof. Numerous other embodiments, modifications and variations within the scope and spirit of the appended claims will occur to persons of ordinary skill in the art from a review of this disclosure.

We claim:

1. A process for inputting characters comprising the steps of:

receiving a first input from a user, the first input including operation of a first single key on a QWERTY keyboard, wherein the operation of the first single key toggles a selection between a character-based language mode and a symbol-based language mode;

in response to selection of the symbol-based language mode, presenting a composition window for entry of a second input using the QWERTY keyboard, for displaying completed symbols in response to entry of the second input and for displaying a candidate window for candidate symbols associated with the second input;

receiving the second input from the user, wherein the second input includes entry of characters by operation of distinct keys once for each character on the QWERTY keyboard to spell a phonetic syllable representing a symbol and to generate a list of candidate symbols in the composition window based on the entry of characters using the QWERTY keyboard to spell the phonetic syllable; and selecting a symbol from the candidate list for placement in the display of completed symbols.

2. The process according to claim 1, wherein the operation of the first single key toggles a selection between a character-based language mode and a symbol-based language mode further comprises switching between an English input mode and a Chinese input mode.

3. The process according to claim 1, wherein the operation of the first single key toggles a selection between a character-based language mode and a symbol-based language mode further comprises launching an end user defined phrase tool and loading context.

4. The process according to claim 1, wherein the operation of the first single key toggles a selection between a character-based language mode and a symbol-based language mode further comprises launching a property setting dialog.

5. The process according to claim 1, wherein the operation of the first single key toggles a selection between a character-based language mode and a symbol-based language mode further comprises switching between an English punctuation mode and a Chinese punctuation mode.

6. The process of claim 1, wherein the first single key is located at bottom portion of the qwerty keyboard.

7. A system for inputting characters comprising:
   means for receiving first input from a user, said first input including operation of a first single key on a QWERTY keyboard, wherein the operation of the first single key toggles a selection between a character-based language mode and a symbol-based language mode;
   means for presenting, in response to selection of the symbol-based language mode, a composition window for entry of a second input using the QWERTY keyboard, for displaying completed symbols in response to entry of the second input and for displaying a candidate window for candidate symbols associated with the second input;
   means for receiving the second input from the user, wherein the second input includes entry of characters by operation of distinct keys once for each character on the QWERTY keyboard to spell a phonetic syllable representing a symbol and to generate a list of candidate symbols in the composition window based on the entry of characters using the QWERTY keyboard to spell the phonetic syllable; and
   means for processing the second input from the user to select a symbol from the candidate list for placement in the display of completed symbols.

8. The system according to claim 7, wherein the means for receiving first input from a user further includes means for switching between an English input mode and a Chinese input mode.

9. The system according to claim 7, further comprises means for launching an end user defined phrase tool and loading context.

10. The system according to claim 7, further comprises means for launching a property setting dialog.

11. The system according to claim 7, further comprising means for switching between an English punctuation mode and a Chinese punctuation mode.

12. A computer readable medium storing computer readable instructions that, when executed, perform a method for inputting characters comprising the steps of:
   receiving a first input from a user, the first input including operation of a first single key on a QWERTY keyboard, wherein the operation of the first single key toggles a selection between a character-based language mode and a symbol-based language mode;
   in response to selection of the symbol-based language mode, presenting a composition window for entry of a second input using the QWERTY keyboard, for displaying completed symbols in response to entry of the second input and for displaying a candidate window for candidate symbols associated with the second input;
   receiving the second input from the user, wherein the second input includes entry of characters by operation of distinct keys once for each character on the QWERTY keyboard to spell a phonetic syllable representing a symbol and to generate a list of candidate symbols in the composition window based on the entry of characters using the QWERTY keyboard to spell the phonetic syllable; and
   responsive to operation of the first single key, processing the operation of the first single key as a function supporting the input of characters of the first character set, wherein the processing step includes turning on a pinyin mode to select the first character set to be pinyin characters selecting a symbol from the candidate list for placement in the display of completed symbols.

13. The computer readable medium of claim 12, wherein the operation of the first single key toggles a selection between a character-based language mode and a symbol-based language mode further comprises switching between an English input mode and a Chinese input mode.

14. The computer readable medium of claim 12, wherein the operation of the first single key toggles a selection between a character-based language mode and a symbol-based language mode further comprises switching between an English punctuation mode and a Chinese punctuation mode.

* * * * *